Figure 1:
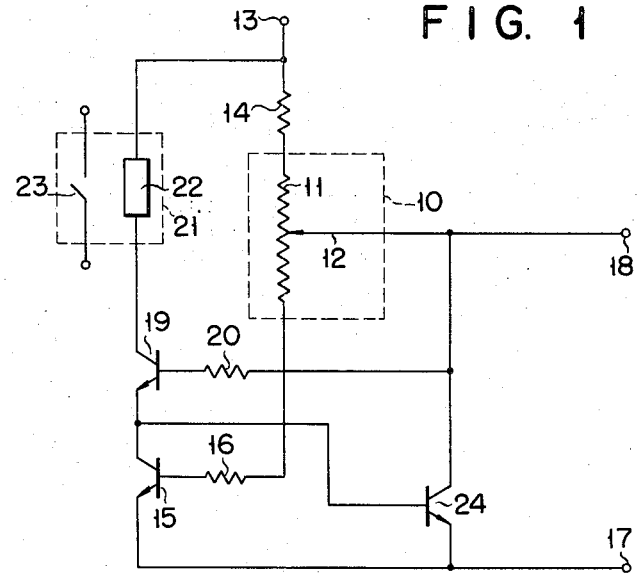

United States Patent
Motoda et al.

[11] 3,810,008
[45] May 7, 1974

[54] APPARATUSES FOR DETECTING FAILURE IN A POTENTIOMETER CIRCUIT

[75] Inventors: Kenro Motoda, Tokyo; Kensuke Hasegawa, Yokohama, both of Japan

[73] Assignee: Motoda Electronics Co., Ltd., Tokyo, Japan

[22] Filed: Aug. 16, 1973

[21] Appl. No.: 388,968

[52] U.S. Cl. .................................. 324/62, 317/9 R
[51] Int. Cl. ......................................... G01r 27/02
[58] Field of Search ....................... 324/62; 317/9 R

[56] References Cited
UNITED STATES PATENTS

| | | | |
|---|---|---|---|
| 3,038,106 | 6/1962 | Cutsogeorge et al. | 324/62 R X |
| 3,040,249 | 6/1962 | Schwarckopf et al. | 324/62 R X |
| 3,046,418 | 7/1962 | Eachus | 324/62 R X |
| 3,259,841 | 7/1966 | Proctor et al. | 324/62 R |

Primary Examiner—Stanley T. Krawczewicz
Attorney, Agent, or Firm—Cushman, Darby & Cushman

[57] ABSTRACT

An apparatus for detecting failure in a potentiometer circuit wherein, for detection of the disconnection of the resistance body of the potentiometer, the base of a first transistor is connected to a first power supply terminal through the resistance body; for detection of the disconnection of a potentiometer slider circuit or non-conduction between the slider and resistance body, the base of a second transistor is connected to the slider; and the collector-emitter paths of the first and second transistors are connected in series between the first and second power supply terminals, so that these transistors are always rendered conducting under a normal condition of the potentiometer circuit. A failure detector, for example, a relay is connected in series to the first and second transistors to detect failure in the potentiometer circuit in response to nonconductive state of at least one of the first and second transistors which is caused by failure in the potentiometer circuit.

5 Claims, 2 Drawing Figures

APPARATUSES FOR DETECTING FAILURE IN A POTENTIOMETER CIRCUIT

This invention relates to an apparatus for detecting any failure in a potentiometer circuit such as disconnection or nonconduction.

A potentiometer is often used as the command signal generator or displacement detector of an automatic control device. However, a potentiometer which includes a slider has a limited life, and moreover is subject to various failures such as the disconnection of a resistance body, non-conduction between the resistance body and slider due to the wear of the slider and the disconnection of external lines connected to the potentiometer. Since these failures sometimes give rise to considerable danger, it is desired to provide a device for immediately detecting any failure associated with a potentiometer such as disconnection or nonconduction.

It is accordingly the object of this invention to provide a circuit arrangement capable of immediately detecting any failure in a potentiometer circuit such as disconnection or nonconduction.

According to an aspect of this invention, there is provided a circuit arrangement for detecting disconnection or nonconduction in a potentiometer circuit in which the resistance body of a potentiometer is connected between first and second power supply terminals and the slider of the potentiometer is connected to an output terminal, the circuit arrangement comprising: a first and a second transistor each provided with collector, emitter and base, the collector-emitter paths of the first and second transistors being connected in series between the first and second power supply terminals, the base of the first transistor being connected to the first power supply terminal through the resistance body, and the base of the second transistor being coupled to the slider, thereby enabling both first and second transistors to be rendered conducting when the potentiometer is operated under a normal condition; and a device for detecting any failure in the potentiometer circuit in response to the nonconducting condition of either of the first and second transistors resulting from the failure.

Figure 2:
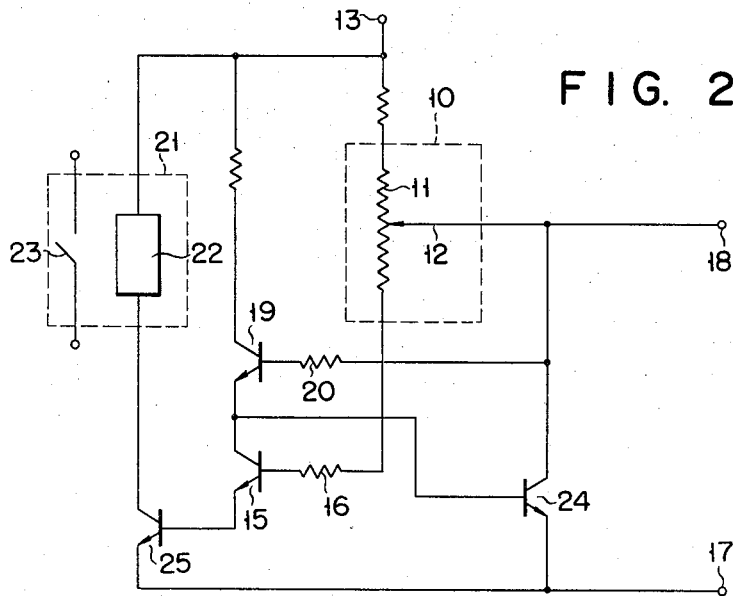

This invention can be more fully understood from the following detailed description when taken in connection with reference to the accompanying drawing, in which:

FIG. 1 is a circuit arrangement according to an embodiment of this invention; and FIG. 2 is a circuit arrangement according to another embodiment of this invention.

Referring to FIG. 1, the resistance body 11 of a potentiometer 10 is connected at one end to a positive power supply terminal 13 directly or through a resistor 14, and at the opposite end to the base of a transistor 15 through a resistor 16. The emitter of the transistor 15 is connected to a negative power supply terminal 17. The slider 12 of the potentiometer 10 is connected to an output terminal 18 and also to the base of a transistor 19 through a resistor 20. The transistor 19 has its emitter connected to the collector of the transistor 15 and its collector connected to the terminal 13 through a failure detector 21. This failure detector 21 may consist of, for example, a relay comprising a coil 22 and a normally closed or normally open contact 23 or a lamp.

The above description outlines the basic construction of an apparatus for detecting any failure in the potentiometer circuit. Now let it be assumed that the potentiomeer 10 is operated under a normal condition. Where, in this case, the transistors 15 and 19 are supplied with a sufficient amount of base current to be rendered conducting, then the coil 22 of the relay 21 is brought to an excited state, causing the contact member 23 to conduct a signal denoting the normal operation of the potentiometer to an external circuitry. Should disconnection occurs in that part of the potentiometer 10 which is positioned above the slider 12, the transistors 15 and 19 have the base current reduced to zero and are turned off. In this case, the coil 22 is deenergized, and the contact member 23 transmits a signal denoting the failure in the potentiometer circuit to the external circuitry. Where disconnection takes place in that part of the potentiometer which is disposed below the slider 12, then the transistor 15 is rendered nonconducting and the coil 22 is deenergized, causing the contact member 23 to conduct the failure signal to the external circuitry.

Where the slider 12 is detached from the resistance body 11 or where disconnection arises in the slider circuit, then the transistor 19 has its base current reduced to zero and the coil 22 is deenergized as in the previous case. Further, where the power source voltage of the potentiometer drops near to zero due to some cause, this event is also taken as an abnormal condition and the contact member 23 gives forth a failure signal.

If, in case the potentiometer is used to supply a command signal to the torque motor of a lift device for vertically moving a weighty object, there should arise any failure in the potentiometer, then the failure detector 21 can control the torque motor. Where disconnection takes place in that part of the potentiometer 10 which is located below the slider 12, a maximum voltage always appears at the output terminal 18, even though the torque motor may be clamped. To avoid such event, it is desired that in case the potentiometer fails, its output voltage be clamped to zero.

A transistor 24 acts as such a clamping device. This transistor 24 has its collector-emitter path connected between the output terminal 18 and power supply terminal 17 and its base connected to the junction of the transistors 15 and 19.

Where the potentiometer 10 is operated under a normal condition, the transistor 15 is rendered conducting and the transistor 24 remains nonconducting, preventing an output voltage from being clamped. Where disconnection occurs in that part of the potentiometer which is positioned below the slider 12, then the transistor 15 is turned off and the transistor 24 has its base potential increased to be rendered conducting, thereby clamping an output voltage.

In FIG. 2 showing another embodiment of this invention, the parts the same as those of FIG. 1 are denoted by the same numerals. According to the embodiment of FIG. 2, the transistor 15 has its emitter connected to the terminal 17 through the base-emitter path of a transistor 25, whose collector is connected to the terminal 13 through the failure detector 21.

While the potentiometer 10 is operated under a normal condition, the transistors 15 and 19 and consequently the transistor 25 are rendered conducting to energize the coil 22. Where the potentiometer fails, at least either of the transistors 15 and 19 whose collector-emitter paths are connected in series is turned off to render the transistor 25 non-conducting and consequently deenergize the coil 22.

What we claim is:

1. A circuit arrangement for detecting disconnection or nonconduction in a potentiometer circuit in which the resistance body of a potentiometer is connected between first and second power supply terminals and the slider of the potentiometer is connected to an output terminal, said circuit arrangement comprising:

a first and second transistor each provided with collector, emitter and base, the collector-emitter paths of said first and second transistors being connected in series between said first and second power supply terminals, the base of said first transistor being connected to said first power supply terminal through said resistance body, and the base of said second transistor being coupled to said slider, thereby enabling both first and second transistors to be rendered conducting when the potentiometer is operated under a normal condition; and a device for detecting any failure in the potentiometer circuit in response to the nonconducting condition of either of said first and second transistors resulting from said failure.

2. A circuit arrangement according to claim 1 wherein said fialure detector is connected between said first and second power supply terminals in series with the collector-emitter paths of said first and second transistors.

3. A circuit arrangement according to claim 1 further comprising a third transistor having collector, emitter and base, whose collector-emitter path is connected between said first and second power supply terminals in series with said failure detector and whose base is coupled to said first power supply terminal through the collector-emitter paths of said first and second transistors.

4. A circuit arrangement according to claim 1 further comprising a fourth transistor having collector, emitter and base whose collector-emitter path is connected between said slider and said second power supply terminal and whose base is coupled to the junction of said first and second transistors.

5. A circuit arrangement according to claim 1 wherein said failure detector comprises a relay.

* * * * *

UNITED STATES PATENT OFFICE
CERTIFICATE OF CORRECTION

Patent No. 3,810,008            Dated May 7, 1974

Inventor(s) Kenro MOTODA et al

It is certified that error appears in the above-identified patent and that said Letters Patent are hereby corrected as shown below:

Priority document not listed on patent should appear as follows:

"Japanese Application No. 82861/72 filed August 21, 1972"

Signed and sealed this 29th day of October 1974.

(SEAL)
Attest:

McCOY M. GIBSON JR.
Attesting Officer

C. MARSHALL DANN
Commissioner of Patents